(12) United States Patent
Berggren et al.

(10) Patent No.: US 11,102,766 B2
(45) Date of Patent: Aug. 24, 2021

(54) UPLINK CONTROL CHANNEL TRANSMISSION IN UNLICENSED COMMUNICATION SPECTRUM

(71) Applicant: Huawei Technologies Co., Ltd., Shenzhen (CN)

(72) Inventors: Fredrik Berggren, Kista (SE); Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/341,779

(22) PCT Filed: Sep. 13, 2016

(86) PCT No.: PCT/EP2016/071501
§ 371 (c)(1),
(2) Date: Apr. 12, 2019

(87) PCT Pub. No.: WO2018/050205
PCT Pub. Date: Mar. 22, 2018

(65) Prior Publication Data
US 2020/0059920 A1  Feb. 20, 2020

(51) Int. Cl.
*H04W 72/04* (2009.01)
*H04L 1/16* (2006.01)
*H04L 5/00* (2006.01)

(52) U.S. Cl.
CPC ....... *H04W 72/0413* (2013.01); *H04L 1/1671* (2013.01); *H04L 5/0055* (2013.01)

(58) Field of Classification Search
CPC ................. H04L 1/1671; H04L 1/1854; H04L 1/1896; H04L 5/001; H04L 5/0023; H04L 5/0055;
(Continued)

(56) References Cited

U.S. PATENT DOCUMENTS 10,511,413 B2 * 12/2019 Dinan ................... H04L 1/1887
2011/0013613 A1 * 1/2011 Sung ..................... H04L 1/1887
370/338

(Continued)

FOREIGN PATENT DOCUMENTS

| CN | 103427962 A | 12/2013 |
|---|---|---|
| WO | 2013172691 A1 | 11/2013 |
| WO | 2016048099 A2 | 3/2016 |

OTHER PUBLICATIONS

"Remaining design on DL/UL HARQ timing for MTC UEs," 3GPP TSG RAN WG1 Meeting #82bis, Malmö, Sweden, R1-155361, pp. Oct. 5-9, 2015,total 6 pages.

(Continued)

*Primary Examiner* — Khaled M Kassim
(74) *Attorney, Agent, or Firm* — Leydig, Voit & Mayer, Ltd.

(57) ABSTRACT

A network node configured to operate in an unlicensed communication spectrum includes a processor and a transceiver, the processor being configured to determine an identifier for subframe for an uplink control channel transmission, the uplink control channel transmission comprising at least HARQ-ACK information, wherein the subframe for the uplink control channel transmission is a function of at least an index of a subframe in a downlink control channel that is configured to transmit the identifier, and the identifier; and wherein the transceiver is configured to transmit the identifier in the downlink control channel.

14 Claims, 8 Drawing Sheets

(58) Field of Classification Search
CPC ............... H04L 5/0092; H04L 5/1469; H04L 72/0413
See application file for complete search history.

(56) References Cited

U.S. PATENT DOCUMENTS

| | | | |
|---|---|---|---|
| 2016/0014706 A1* | 1/2016 | Vajapeyam | ....... H04W 56/0065 370/328 |
| 2016/0226630 A1 | 8/2016 | Zhang et al. | |
| 2017/0310452 A1 | 10/2017 | Lee et al. | |
| 2018/0359772 A1* | 12/2018 | Park | ....... H04W 16/14 |
| 2019/0116005 A1* | 4/2019 | Harada | ....... H04L 1/1822 |
| 2019/0223204 A1* | 7/2019 | Kim | ....... H04W 72/14 |
| 2020/0119861 A1* | 4/2020 | Dinan | ....... H04L 1/1896 |

OTHER PUBLICATIONS

"HARQ-ACK payload adaptation for Rel-13 CA," 3GPP TSG RAN WG1 Meeting #82bis, Malmo, Sweden, R1-155376, XP051002283, 3rd Generation Partnership Project, Valbonne, France (Oct. 2015).
"UCI transmission for Rel-14 eLAA," 3GPP TSG RAN WG1 Meeting #84bis, Busan, Korea, R1-162262, XP051080067, 3rd Generation Partnership Project, Valbonne, France (Apr. 2016).
"UCI transmission for eLAA," 3GPP TSG RAN WG1 Meeting#85, Nanjing, China, R1-164076, XP051096608, 3rd Generation Partnership Project, Valbonne, France (May 2016).

\* cited by examiner

UPLINK CONTROL CHANNEL TRANSMISSION IN UNLICENSED COMMUNICATION SPECTRUM

CROSS-REFERENCE TO RELATED APPLICATIONS

This application is a national stage of International Application No. PCT/EP2016/071501, filed on Sep. 13, 2016, which is hereby incorporated by reference in its entirety.

TECHNICAL FIELD

The aspects of the present disclosure relate generally to wireless communication systems and more particularly to uplink control channel transmission in a wireless communication system.

BACKGROUND

The uplink control channel (e.g., the Physical Uplink Control Channel (PUCCH) in the Long Term Evolution (LTE) system) is used to feedback uplink control information (UCI), such as HARQ-ACK responses (e.g., Acknowledgement (ACK) or negative ACK (NACK)) associated with downlink transmissions. For LTE FDD and TDD, there is a pre-defined mapping of the timing between downlink and uplink subframes in terms of associated HARQ-ACK transmission.

For transmission in the unlicensed spectrum, a Listen-before-Talk (LBT) procedure is typically performed prior to transmission. The direction (uplink or downlink) of a subframe is not pre-determined and the base station (e.g., eNodeB in LTE) may transmit a burst of downlink subframes, or schedule a burst of uplink subframes, once the channel is claimed. A burst may or may not comprise a set of contiguous downlink or uplink subframes or only downlink subframes or uplink subframes. Hence, due to the undetermined direction of the subframe, the HARQ-ACK timing cannot be pre-defined (i.e., it cannot be a function of the subframe number) or cannot be obtained implicitly as in a typical TDD system. It is therefore a problem to provide a HARQ-ACK timing (i.e., a linkage to an uplink subframe) for a subframe which has been used as a downlink subframe.

Accordingly, it would be desirable to be able to provide a system for explicitly determining subframes for transmitting the uplink control channel in the unlicensed communication spectrum in a manner that addresses at least some of the problems identified above.

SUMMARY

It is an object of the disclosure to provide an efficient signalling scheme for determining uplink subframes for uplink control channel transmission in a wireless communication system. This object is solved by the subject matter of the independent claims. Further advantageous modifications can be found in the dependent claims.

According to a first aspect of the disclosure the above and further objects and advantages are obtained by a network node configured to operate in an unlicensed communication spectrum. The network node includes a processor and a transceiver, the processor being configured to determine an identifier for a subframe for an uplink control channel transmission, the uplink control channel transmission comprising at least HARQ-ACK information, wherein the subframe for the uplink control transmission is a function of at least an index of a subframe in a downlink control channel that is configured to transmit the identifier, and the identifier; and wherein the transceiver is configured to transmit the identifier in the downlink control channel. The aspects of the disclosed embodiments explicitly determine subframes for transmitting the uplink control channel.

In a first possible implementation form of the network node according to the first aspect, the identifier is transmitted in the subframe of the downlink control channel. The identifier can be transmitted in any number of subframes.

In a second possible implementation form of the network node according to the first aspect, the identifier is transmitted in one or more other subframes of the downlink control channel. The identifier can be transmitted in any number of subframes.

In a third possible implementation form of the network node according to the first aspect as such or according to any one of the preceding possible implementation forms, the processor is configured to set a value of the identifier at a same value in at least two subframes of the downlink control channel. This allows transmitting the uplink control channel as soon as possible after the transmission burst ends.

In a fourth possible implementation form of the network node according to the first aspect as such or according to any one of the preceding possible implementation forms the processor is configured to set a value of the identifier at a first value in a first subframe of the downlink control channel and at a second value different from the first value in at least one other subframe. This allows the network node to determine a suitable subframe for uplink control channel transmission beforehand.

In a fifth possible implementation form of network node according to the first aspect as such or according to any one of the preceding possible implementation forms the processor is configured to set a value of the identifier such that the identified at least one subframe for the uplink control channel transmission is a subframe configured with a number of occupied OFDM symbols that is less than a maximum number of uplink OFDM symbols of a subframe as defined by the wireless communication system. Subframes can have different lengths in terms of uplink or downlink subframes and the network node can choose an identifier so that it relates to a subframe with this property. For example, subframes may not comprise only OFDM symbols for downlink transmission or may not comprise only OFDM symbols for uplink transmission. The maximum number of OFDM symbols may refer to the maximum number of OFDM symbols available for downlink transmission. The maximum number of OFDM symbols may refer to the maximum number of OFDM symbols available for uplink transmission.

In a sixth possible implementation form of the network node according to the first aspect as such or according to any one of the preceding possible implementation forms the processor is configured to set a value of the identifier such that the identified at least one subframe for the uplink control channel transmission requires performing a listen before talk process with a pre-defined sensing interval. This allows transmission of the PUCCH in the first subframe for which LBT is successful.

In a seventh possible implementation form of the network node according to the first aspect as such or according to any one of the first to fifth preceding possible implementation forms the processor is configured to set a value of the identifier such that transmission in the identified at least one subframe for the uplink control channel transmission does not require performing a listen before talk process.

In an eight possible implementation form of the network node according to the first aspect as such or according to any one of the preceding possible implementation forms the network node is configured to include one or more of a primary serving cell and at least one secondary serving cell, and wherein the processor is configured to signal an identifier in at least one subframe of a downlink control channel associated with each of the primary serving cell and the at least one secondary serving cell. This allows the network node to select a subframe for the uplink control channel transmission which can accommodate HARQ-ACKs for more than one carrier.

In a ninth possible implementation form of the network node according to the first aspect as such or according to any one of the preceding possible implementation forms the processor is configured to include the identifier in a downlink control information (DCI) message contained in a downlink control channel that schedules a physical downlink shared channel (PDSCH). This allows the identifiers to be receiver specific and provides maximum flexibility for the network node to arrange the identification of the subframes for PUCCH transmission.

In a tenth possible implementation form of the network node according to the first aspect as such or according to any one of the preceding possible implementation forms, the processor is configured to include the identifier in a common downlink control information (DCI) message, the common DCI comprising at least information of a number of OFDM symbols of a subframe, and wherein the transceiver is configured to transmit the common downlink control information message in a subframe having an index n−1 or n of the at least one subframe of the downlink control channel. This allows the identifiers to be cell specific and reduces the overhead in the PDCCH and EPDCCH.

In an eleventh possible implementation form of the network node according to the first aspect as such or according to any one of the preceding possible implementation forms the processor is configured to associate the identifier with a set of subframes for uplink control channel transmission, and identify the at least one subframe from the set of uplink subframes for the uplink control channel transmission. This offers more opportunities of transmitting the PUCCH.

According to a second aspect of the disclosure, the above and further objects and advantages are obtained by a communication apparatus for a wireless communication system. The wireless communication system is configured to operate in an unlicensed communication spectrum and includes a processor and a transceiver. The transceiver is configured to receive at least one identifier in an at least one subframe in a downlink control channel. The processor is configured to determine at least one subframe for uplink control channel transmission from at least the identifier and an index of a subframe in the downlink control channel. The transceiver is configured to transmit at least a HARQ-ACK feedback in the determined at least one subframe for uplink control channel transmission. The aspects of the disclosed embodiments explicitly determine subframes for transmitting the uplink control channel.

In a first possible implementation form of the communication apparatus according to the second aspect as such the transceiver is configured to receive data transmissions from one or more of a primary serving cell and at least one secondary serving cell, and wherein the processor is configured to identify the identifier from at least one in a downlink control channel of the primary serving cell and the at least one secondary serving cell. This allows selection of a subframe for the uplink control channel transmission which can accommodate HARQ-ACKs for more than one carrier.

In a second possible implementation form of the communication apparatus according to the second aspect as such or according to the first possible implementation form of the second aspect the processor is configured to identify a last subframe of the at least one downlink control channel associated with the primary serving cell and at least one secondary serving cell, and use the identifier and the index from the identified last subframe to determine the subframe for the uplink control channel transmission. This allows selection of a subframe for the uplink control channel transmission which can accommodate HARQ-ACKs for more than one carrier.

In a third possible implementation form of the communication apparatus according to the second aspect as such, or according to any one of the first and second possible implementation forms of the second aspect the transceiver is configured to receive at least two identifiers identifying a set of at least two subframes for the uplink control channel transmission, and the processor is configured to transmit the HARQ-ACK feedback in a first subframe from the set of at least two subframes where an uplink control channel transmission is permitted. This allows the transmission of the PUCCH in the first subframe of the set for which LBT is successful.

According to a third aspect of the disclosure, the above and further objects and advantages are obtained by a method. In one embodiment, the method includes providing an identifier, wherein the identifier is configured to be used by a network node to identify at least one subframe for an uplink control channel transmission, the uplink control channel transmission comprising at least HARQ-ACK information, wherein the determined subframe is at least a function of an index of a subframe in a downlink control channel that is configured to transmit the identifier, and the identifier; and transmitting the identifier in at least one subframe of the downlink control channel. The aspects of the disclosed embodiments explicitly determine subframes for transmitting the uplink control channel.

In a first possible implementation form of the method according to the third aspect as such, the method includes receiving the identifier in the at least one subframe in the downlink control channel; determining the at least one subframe for the uplink control channel transmission from the identifier and the index; and transmitting at least a HARQ-ACK feedback in the determined at least one subframe. The aspects of the disclosed embodiments explicitly determine subframes for transmitting the uplink control channel.

According to a fourth aspect of the disclosure, the above and further objects and advantages are obtained by a method. In one embodiment, the method includes receiving at least one identifier in an at least one subframe in a downlink control channel; determining at least one subframe for uplink control channel transmission from at least the identifier, and an index of a subframe in the downlink control channel; and transmitting at least a HARQ-ACK feedback in the determined at least one subframe. The aspects of the disclosed embodiments explicitly determine subframes for transmitting the uplink control channel.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, the disclosure will be explained in more detail with reference to the example embodiments shown in the drawings, in which.

DETAILED DESCRIPTION OF THE DISCLOSED EMBODIMENTS

Figure 1:
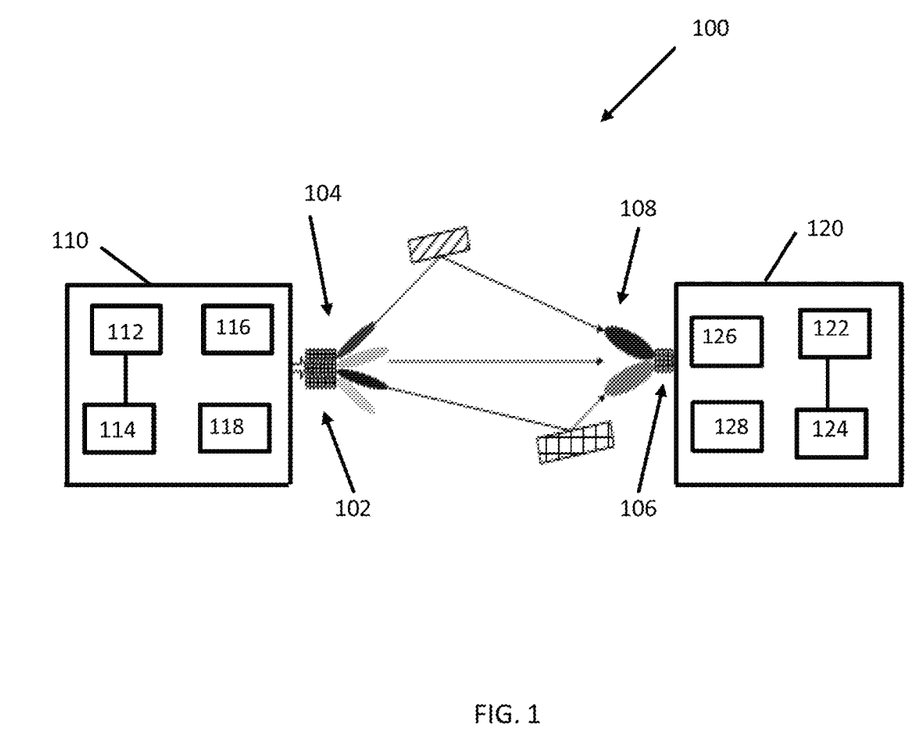
FIG. 1 is a block diagram illustrating an exemplary wireless communication system incorporating aspects of the disclosed embodiments.

Referring to FIG. 1 there can be seen an exemplary block diagram of a wireless communication system 100 incorporating aspects of the disclosed embodiments. The aspects of the disclosed embodiments are directed to providing, in the downlink control channel, an explicit indication of the subframe(s) to be used for the uplink control channel transmission.

As is illustrated in FIG. 1, the wireless communication system 100 includes at least one network node 110 and at least communication apparatus 120. The wireless communication system 100 can be any suitable type of wireless communication system, such as for example, but not limited to LTE, 5G or new radio (NR). In one embodiment, the network node 110 can comprise or include a network node such as an Evolved Universal Terrestrial Radio Access Network (E-UTRAN) NodeB or evolved NodeB (eNB). The communication apparatus 120 can comprise or include a user node or equipment (UE) such as a mobile communication device, for example.

In the example of FIG. 1, the network node 110 includes at least one processor 112 and at least one transceiver device 114. While the processor 112 and transceiver 114 are shown in FIG. 1 as being separate devices, in alternate embodiments, the processor 112 and transceiver device 114 can comprise a single device. The network node 110 can include any suitable number of processors 112 and transceivers 114, depending upon the particular application and implementation.

The network node 110 can also include one or more antennas or antenna arrays 102. The antennas or antenna arrays 102 will be generally configured to generate one or more directional beams, generally referred to herein as directional beams 104.

The communication apparatus 120 generally includes a transceiver 122 and a processor 124. Although the transceiver 122 and processor 124 are shown in the example of FIG. 1 as separate devices, in alternate embodiments, the transceiver 122 and processor 124 can comprise a single device or unit. The communication apparatus 120 can include any suitable number of transceivers 124 and processors 122, depending upon the particular application and implementation.

The communication apparatus 120 will also include one or more antennas or antenna arrays 106. The antennas 106 are configured to generate one or more receiving beam patterns 108, to receive, among other things, the signals transmitted from the network node 110.

For communications in the unlicensed communication spectrum, it can be difficult to provide a time linkage to an uplink subframe from a subframe which has been used as a downlink subframe. The aspects of the disclosed embodiments provide an indicator or identifier d in a downlink control channel for explicitly defining one or several subframes for uplink control channel transmission in the unlicensed communication spectrum. While the aspects of the disclosed embodiments are described herein with respect to the unlicensed communication spectrum, the aspects of the disclosed embodiments are not so limited. For example, the aspects of the disclosed embodiments may be applied to transmissions in the licensed spectrum, particularly for cases where there are no pre-defined uplink-downlink configurations of the subframes such that it is not possible to implicitly derive the HARQ-ACK timing from only a subframe index.

In one embodiment, the network node (110) is configured to determine an identifier d for a subframe for an uplink control channel transmission. The uplink control channel transmission generally comprises at least HARQ-ACK information. In this example, the index of the subframe for the uplink control channel transmission is at least a function of at least an index n of a subframe in a downlink control channel that is configured to transmit the identifier d, and the identifier d.

The transceiver (114) is generally configured to transmit the identifier d in the downlink control channel. From the identifier d, the communication apparatus 120 can determine the subframe to transmit the uplink control channel with HARQ-ACK. Typically, it is assumed that subframes constitute a larger entity, e.g., a radio frame and that there is an indexing (e.g., n=0, 1, . . . N−1) of subframes. It should be realized that the term subframe as herein is not limiting and the notion of slots or mini-slots could equally apply to the aspects of the disclosed embodiments.

In one embodiment, the term "subframe" or "subframes" as used herein can generally be interpreted to include subframes which comprise both symbols for downlink transmission and symbols for uplink transmission. These subframes can include for example, partial length subframes, such as the special subframes in the LTE system. In that sense, the notion of a downlink subframe and uplink subframe may not exist. In accordance with the aspects of the disclosed embodiments the indicator or identifier d is configured to be used to associate downlink transmissions in one subframe with associated uplink control channel transmission in another subframe, where the subframes may contain both a downlink part and an uplink part.

In one embodiment, the signaled identifier d provides a one-to-one mapping and the subframe for the uplink control channel transmission associated with the subframe in the downlink control channel identified by index n is determined by n+m+d. In this example, n is the index corresponding to a subframe in the downlink control channel and m is a pre-determined value. The pre-determined value m can be a predetermined offset accounting for a minimum delay due to transmit/receive processing (e.g., m=4 subframes). The receiver may be capable of supporting different values of m, and m could be determined implicitly (e.g., from information in the downlink control channel such as the scheduled transport block size (TBS), since the processing time is shorter for a small TBS) or it could be determined explicitly (e.g., being signaled in the downlink control channel, or being configured by higher layer RRC (Radio Resource Control) signaling).

In one embodiment, the pre-determined value m is part of, or included in the identifier d. The identifier d could be signaled by k bits resulting in a range of d=0 to $d=2^k-1$. Alternatively, the identifier d could be jointly encoded with other information in the downlink control channel (e.g., HARQ-ACK process numbers, subframe indices allocated for multi-subframe scheduling, transmission burst duration etc.) thereby potentially offering overhead savings.

Figure 2:
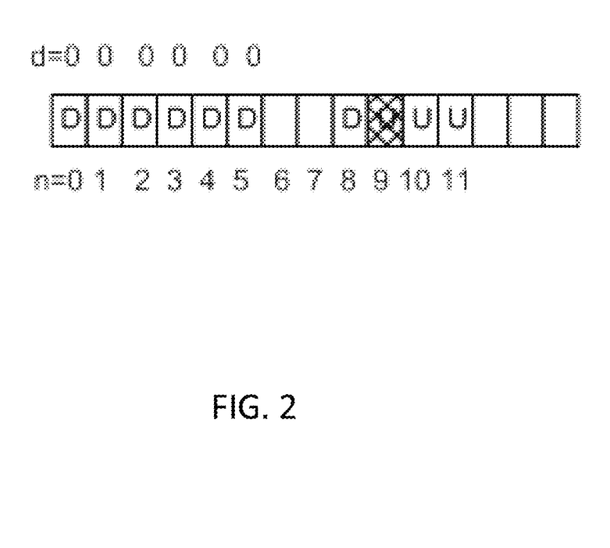
FIG. 2 illustrates an example where the signalled identifier is constant among the downlink subframes in accordance with the aspects of the disclosed embodiments.

Referring to FIG. 2, in one embodiment, the identifier d is allowed to remain constant among the subframes in the downlink transmission burst, i.e., different subframes U for uplink transmission can be indicated from different subframes D for downlink transmission. In this example the signalled identifier d is kept constant among the sub frames D, and m=4. When scheduling the sub frame D identified by index n=0, if the network node 110 has no prediction of the length of the downlink transmission burst, the network node 110 assumes that sub frame n=4 will be used for the uplink control channel transmission, also referred to herein as "PUCCH." However, as the network node 110 continues to schedule subframe n=1, the identifier d=0 provided by the network node 110 indicates that sub frame n=5 will be used for the uplink control channel transmission. In the last sub frame of the burst, the network node 110 again signals the identifier value d=0, indicates that subframe n=9 is utilized for the uplink control channel transmission.

As noted, in the example of FIG. 2, the identifier d=0 in the subframe D identified by the index n=5 defines the subframe U identified by the index n=9 to be used for the uplink control channel transmission. This is advantageous since it allows transmitting the uplink control channel as soon as possible after the transmission burst ends although the length of the burst is typically unknown to the network node 110 until the last subframe of the burst. In this embodiment, the communication apparatus 120 may assume that the identifier d in any subframe should be used to identify the subframe for the uplink control channel transmission.

For transmissions in the unlicensed spectrum, there is typically a maximum channel occupancy time, i.e., a maximum time during which transmissions can occur once the channel has been accessed, until a new LBT procedure has to be initialized. A further advantage of transmitting the uplink control channel as soon as possible after the transmission burst ends is that it increases the chance that the transmission occurs inside the channel occupancy period. If on the other hand, the transmission would occur outside the current channel occupancy period, a new (longer) LBT procedure may have to be performed to claim the channel again.

Figure 3:
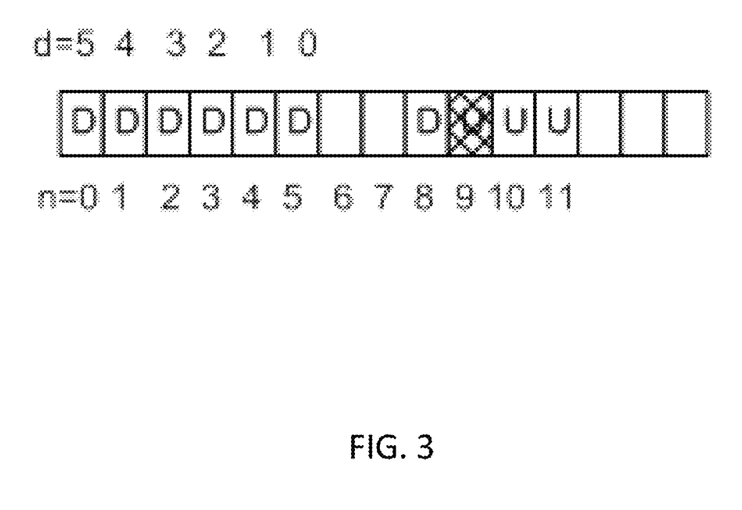
FIG. 3 illustrates an example where the signalled identifier changes among the downlink subframes in accordance with the aspects of the disclosed embodiments.

In one embodiment, referring to FIG. 3, the identifier d is allowed to change among the subframes D in the downlink transmission burst, i.e., the same subframes for the uplink transmission can be indicated from different downlink subframes. This is advantageous since it allows the network node 110 to determine a suitable subframe for uplink control channel transmission beforehand. For example, as will be described below, the network node 110 could choose to indicate a subframe of partial length, i.e., where the number of OFDM symbols for downlink or uplink transmission is smaller than the maximum number of such OFDM symbols supported by the system. An advantage of utilizing a subframe of partial length is that channel access may be quicker since it may be allowed to use a shorter LBT procedure for such a subframe. An advantage of quick HARQ-ACK response is that the latency of the system decreases, which is beneficial for delay sensitive applications.

Typically an LBT procedure is performed where a transceiver senses the channel, i.e., measures received energy and compares it with a threshold to evaluate if the channel is free. Some LBT schemes are contention window based, utilizing a randomly drawn counter which is decreased when sensing slots are free, until the counter has reached a certain value. Other LBT schemes are based on a pre-defined sensing period, which may start and stop at predefined instances, which could yield faster channel access. For an instance of a pre-defined sensing period of zero length, LBT is not performed.

In the example of FIG. 3, the value of the identifier d is decremented in each subframe D, from n=0 to n=5. In this case, the network node 110 may have some knowledge of the length of the transmission burst. Alternatively, the network node 110 may prefer to use the subframe n=9 for the uplink control channel transmission. In this manner, the network node 110 can indicate to use subframe n=9 for the uplink control channel transmission already during the transmission of subframe n=0. For example, subframe n=9 may be a subframe of partial length offering PUCCH transmission without LBT and it may be preferable to utilize this subframe of partial length identified by index n=9 instead of the subframe identified by index n=10 or n=11. Thus, in this example the PUCCH will be transmitted in subframe n=9. One advantage of this embodiment is that the robustness increases, since even if the receiver is unable to detect the identifier d in some subframes in the downlink control channel, the indicators d in the other subframes still provide unambiguous information to determine the correct subframe for the uplink control channel transmission.

In one embodiment, different identifiers d can be signalled on different carriers. In LTE-Advanced, carrier aggregation is performed by receiving/transmitting on a set of serving cells, wherein a serving cell comprises at least a DL component carrier and possibly an UL component carrier. A user equipment, such as the communication apparatus 120, is typically configured with a primary serving cell (PCell) 126 and additionally also with secondary serving cells (SCells) 128. The reference to a cell in this example is not limited to a geometrical area. Rather, the reference to a cell can also be regarded as logical concept. Signalling the identifiers d on different carriers is advantageous as it allows the network node 110 to select a subframe for the uplink control channel transmission which can accommodate HARQ-ACKs for more than one carrier.

Figure 4:
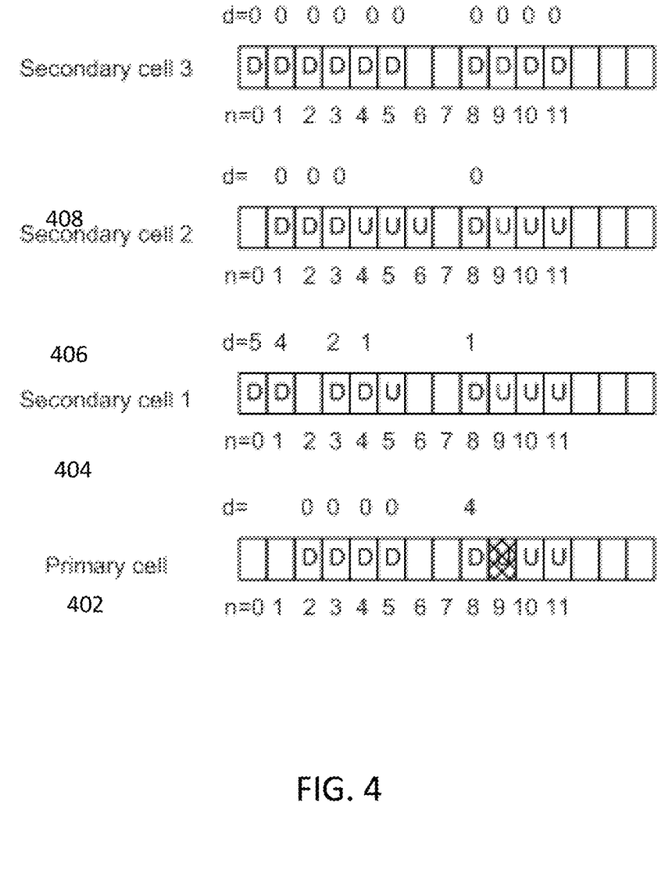
FIG. 4 illustrates an example of carrier aggregation where the signalled identifiers are different among the downlink subframes and carriers in accordance with the aspects of the disclosed embodiments.

Referring also to FIG. 1, FIG. 4 shows one example where the carriers include one primary cell 402 and three secondary cells 404, 406, 408. The transmission bursts in each of the primary cell 402 and secondary cells 404, 406, 408 have different lengths and alignment. In this example, the behaviour of the communication apparatus 120 is that the identifiers d in the last received subframe in the downlink transmission burst among all of the carriers are used. Thus, in this example, the subframe for the uplink control channel transmission is determined from:

$$n = n_{i^*} + m + d_{i^*}(n_{i^*})$$

$$i^* = \underset{i \in C}{\operatorname{argmax}} \, n_i$$

where C is the set of carriers and i* is the carrier index associated with the last received subframe in the downlink transmission burst. In this example, the PUCCH transmission will occur in subframe n=9 on the primary cell 402, which is determined from the indicator d=0 in subframe n=5 in secondary cell 408 and indicator d=0 in subframe n=5 the primary cell 402. It is noted that in secondary cell 406, the indicator d=0 in subframe n=3 indicates that subframe n=7 should be used, where m=4. However, this indication is overridden by the indicator d=0 in subframe n=5 in secondary cell 408 and the indicator d=0 in subframe n=5 of the primary cell 402. In this example, the probability of misinterpreting the correct subframe could be low and would only happen if the communication apparatus 120 does not receive the downlink control channels (PDCCHs) in the last subframe among all of the transmission bursts. It is noted that a skilled reader can generalize the example of FIG. 4 to the case where there is one set of secondary cells of which one may transmit a PUCCH, such that determining the PUCCH subframe on this secondary cell is made from the indicators d provided only for this set of secondary cells In one embodiment, the identifier d is transmitted in downlink control information (DCI) messages which schedule the PDSCH. The DCIs are transmitted in the downlink control channel, e.g., the PDCCH. Therefore, since the PDCCH can schedule users individually, the identifiers d are receiver-specific. This is advantageous as it provides maximum flexibility for the network node 110 to arrange the identification of the uplink subframe(s) for PUCCH transmission.

In a further embodiment, the identifier d is only transmitted in common DCI messages, e.g., those which are transmitted in the last two subframes of the downlink transmission burst, carrying information about the length of the burst, or subframe configuration (i.e., number of OFDM symbols for downlink and uplink, respectively). Therefore, since the information is common to users, the identifiers d are cell-specific. This is advantageous as it reduces the overhead in the PDCCH and EPDCCH, since the identifier d is only contained in the common DCI message of the last two subframes of the transmission burst. One example of this is shown in FIG. 5.

Figure 5:
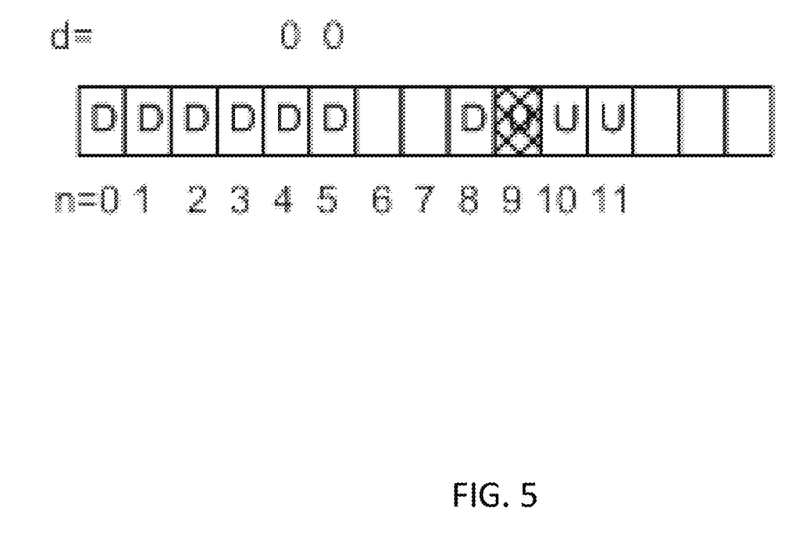
FIG. 5 illustrates an example where the signalled identifier is transmitted in the last two subframes of the transmission burst in accordance with the aspects of the disclosed embodiments.

In the example of FIG. 5, the identifier d is only transmitted in the last 2 subframes n=4 and n=5 of the downlink transmission burst. The identifier d in this example is constant among the subframes n=4 and n=5. The identifier d=0 in subframe n=5 defines subframe n=9, where m=4, to be used for the uplink control channel transmission. Generally, if subframe index n is the last subframe of the downlink transmission burst, the second to last subframe can be denoted by index n−1.

In another embodiment, the identifier d is configured to provide a many-to-one mapping wherein a subframe n of the downlink channel may be associated with one or more subframes for the uplink control channel transmission. This is advantageous since it offers more opportunities for transmitting the PUCCH. For example, if the LBT fails, the communication apparatus 120 will not be allowed to transmit in that subframe. Thus, HARQ-ACK may not be fed back, therefore the network node 110 will interpret this as if the downlink data transmissions where not detected. The network node 110 may then initiate unnecessary re-transmissions of data, which will reduce the efficiency and throughput of the system 100. However, the communication apparatus 120 could potentially transmit in a later subframe, for which the LBT succeeds.

The network node 110 could provide an identifier d associated with a set of subframes that can be used to transmit the PUCCH. In this embodiment, the communication apparatus 120 could transmit the PUCCH in the first subframe of the set for which the LBT was successful. The network node 110 may then perform detection of the PUCCH in the indicated subframes. The network node could perform the detection sequentially, starting with the earliest indicated subframe, and so on, until it detects the PUCCH.

In one embodiment, the indication of the subframes in the set could be determined by {n+m+d, . . . , n+m+d+k}, where m is a predetermined offset accounting for a minimum delay due to transmit/receive processing (e.g., m=4 subframes), d is a signaled identifier and k is a constant. This results in a set of k+1 contiguous subframes usable for PUCCH transmission. The constant k may be predefined or could be configurable by higher layer network signaling (e.g., RRC or Medium Access Control (MAC) signaling). In a more general form, the value of the identifier d can be associated with a set $R_d$ comprising a set of non-negative offset values. The values in the sets $R_d$ could be configurable (e.g., be signalled by higher layers or be pre-defined) by the communication network 100. This form is advantageous since a set $R_d$ is not constrained to result in a set of contiguous subframes usable for PUCCH transmission. Furthermore, the sets $R_d$ could be unique, thereby offering large flexibility in arranging the subframes for PUCCH transmission. Furthermore, fewer indicators d may need to be supported, since each indicator d corresponds to a set comprising multiple elements. Hence, an advantage is that fewer bits could be needed for signalling the indicator d and overhead saving could be possible.

Figure 6:
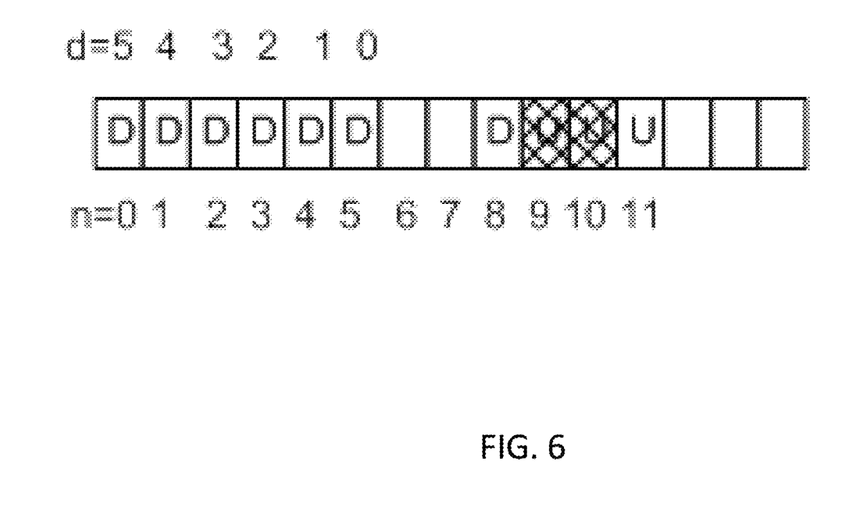
FIG. 6 illustrates another example where the signalled identifier changes among the downlink subframes in accordance with the aspects of the disclosed embodiments.

Examples of the sets of integers $R_d$ could include:

$R_d = \{0\}, \forall d$ $R_d = \{d\}$ $R_d = \{0, 1, \ldots, p(d)\}$, where $p(d) > 0$ $R_d = \{q, q+1, \ldots, q+p(d)\}$, where $q, p(d) > 0$ One example shown in FIG. 6, is where the set is $R_d=\{0,1\}$ which results in that the subframe is determined by $\{n+4+d, n+5+d\}$. In the example of FIG. 6, the identifier d changes among the subframes n=0 to n=5. The identifiers d in subframes n=0 to n=5 define subframe n=9 or n=10 to be used for the uplink control channel transmission.

Figure 7:
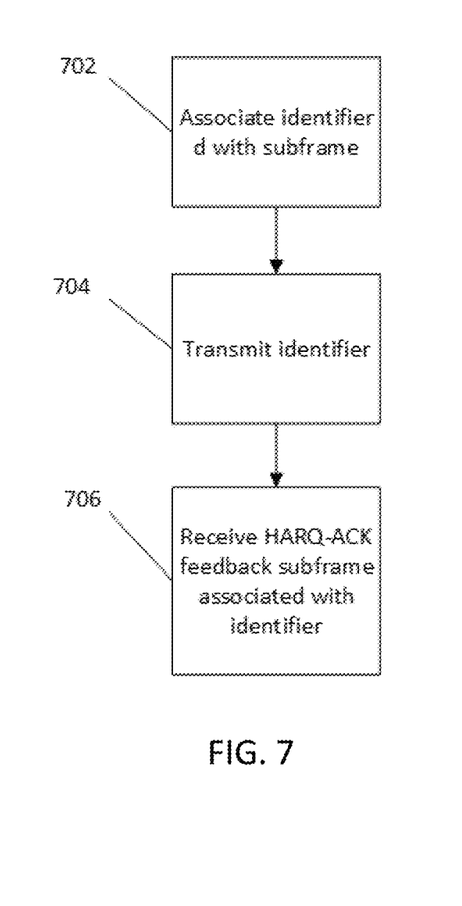
FIG. 7 illustrates a exemplary process flow of network node operations in a system incorporating aspects of the disclosed embodiments.

FIG. 7 illustrates one example of a process flow in the network node 110 in a system 100 of the disclosed embodiments. In this example, an identifier d is provided or associated 702 with one or more subframes of the downlink control channel. The identifier d will be used by the network node 110 to identify at least one subframe for an uplink control channel transmission.

The uplink control channel transmission will include at least HARQ-ACK information. The determined subframe for the uplink control channel transmission is at least a function of an index n of a subframe in a downlink control channel that is configured to transmit the indicator d, and the indicator d.

The network node 110 is configured to transmit 704 the indicator d in at least one subframe of the downlink control channel. In one embodiment, the network node 110 is configured to receive 706 the HARQ-ACK on the subframe(s) identified by the identifier d.

Figure 8:
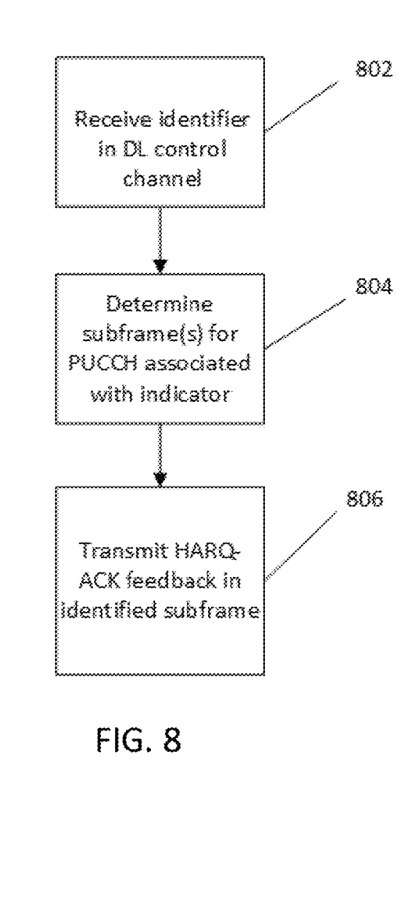
FIG. 8 illustrates a exemplary process flow of a communication apparatus operations in a system incorporating aspects of the disclosed embodiments.

FIG. 8 illustrates an exemplary process flow in a communication apparatus 120 in a system 100 incorporating aspects of the disclosed embodiments. In one embodiment, the identifier d is received 802 in a subframe of a downlink control channel. At least one subframe is determined 804 for the uplink control channel transmission. The HARQ-ACK can be transmitted 806 in the determined at least one subframe for the uplink control channel transmission.

Figure 9:
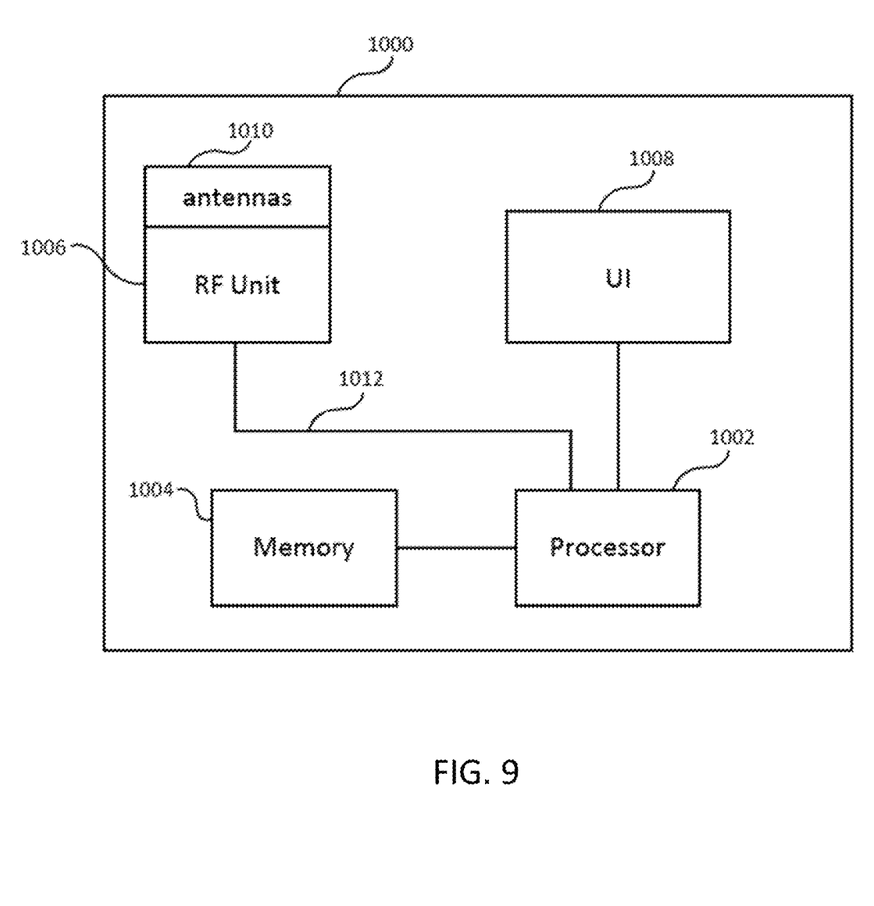
FIG. 9 is a block diagram of an exemplary computing architecture that can be used to implement aspects of the disclosed embodiments.

FIG. 9 illustrates a block diagram of an exemplary transceiver apparatus 1000 appropriate for implementing aspects of the disclosed embodiments. The transceiver apparatus 1000 is appropriate for use in a wireless network and can be implemented in one or more of the network node 110 or the communication apparatus 120, such as for the transceiver 114 and/or transceiver 122. The network node 110 can comprise or include an Evolved Universal Terrestrial Radio Access Network (E-UTRAN) NodeB or evolved NodeB (eNB). The communication apparatus 120 can comprise or include various types of mobile computing devices, including various types of wireless communications user equipment such as cell phones, smart phones, tablet devices, and wirelessly connected automobiles. Alternatively the transceiver apparatus 1000 may be configured in or as an access node or base station in a wireless communication network.

The transceiver apparatus 1000 includes or is coupled to a processor or computing hardware 1002, a memory 1004, a radio frequency (RF) unit 1006 and a user interface (UI) 1008. In certain embodiments such as for an access node or base station, the UI 1008 may be removed from the transceiver apparatus 1000. When the UI 1008 is removed the transceiver apparatus 1000 may be administered remotely or locally through a wireless or wired network connection (not shown).

The processor 1002 may be a single processing device or may comprise a plurality of processing devices including special purpose devices, such as for example, digital signal processing (DSP) devices, microprocessors, graphics processing units (GPU), specialized processing devices, or general purpose computer processing unit (CPU). The processor 1002 often includes a CPU working in tandem with a DSP to handle signal processing tasks. The processor 1002, which can be implemented as one or more of the processors 112 and 124 described with respect to FIG. 1, may be configured to implement any of the methods described herein.

In the example of FIG. 10, the processor 1002 is configured to be coupled to a memory 1004 which may be a combination of various types of volatile and non-volatile computer memory such as for example read only memory (ROM), random access memory (RAM), magnetic or optical disk, or other types of computer memory. The memory 1004 is configured to store computer program instructions that may be accessed and executed by the processor 1002 to cause the processor 1002 to perform a variety of desirable computer implemented processes or methods such as the methods as described herein.

The program instructions stored in memory 1004 are organized as sets or groups of program instructions referred to in the industry with various terms such as programs, software components, software modules, units, etc. Each module may include a set of functionality designed to support a certain purpose. For example a software module may be of a recognized type such as a hypervisor, a virtual execution environment, an operating system, an application, a device driver, or other conventionally recognized type of software component. Also included in the memory 1004 are program data and data files which may be stored and processed by the processor 1002 while executing a set of computer program instructions.

The transceiver 1000 can also include an RF Unit 1006 coupled to the processor 1002 that is configured to transmit and receive RF signals based on digital data 1012 exchanged with the processor 1002 and may be configured to transmit and receive radio signals with other nodes in a wireless network. In certain embodiments, the RF Unit 1006 includes receivers capable of receiving and interpreting messages sent from satellites in the global positioning system (GPS) and work together with information received from other transmitters to obtain positioning information pertaining to the location of the computing device 1000. To facilitate transmitting and receiving RF signals the RF unit 1006 includes an antenna unit 1010 which in certain embodiments may include a plurality of antenna elements. The multiple antennas 1010 may be configured to support transmitting and receiving MIMO signals as may be used for beamforming. The antenna unit 1010 of FIG. 10 can be implemented as one or more of the antenna unit 102 or the antenna unit 106 shown in FIG. 1.

The UI 1008 may include one or more user interface elements such as a touch screen, keypad, buttons, voice command processor, as well as other elements adapted for exchanging information with a user. The UI 1008 may also include a display unit configured to display a variety of information appropriate for a computing device or mobile user equipment and may be implemented using any appropriate display type such as for example organic light emitting diodes (OLED), liquid crystal display (LCD), as well as less complex elements such as LEDs or indicator lamps.

The aspects of the disclosed embodiments provide reliable determination of subframes for uplink control channel transmission. An indicator or identifier is explicitly signalled in the downlink control channel that identifies one or several uplink subframes for an uplink control channel transmission. It is desirable that the uplink subframe(s) can be reliably determined, otherwise the PUCCH cannot be transmitted, implying that HARQ-ACK feedback becomes unavailable, resulting in throughput losses.

The aspects of the disclosed embodiments further provide flexibility for the base station to determine suitable subframes during its scheduling operation, on one or several downlink carriers. The length of the downlink transmission burst depends on the scheduling and may not be known in advance. Flexibility in determining the uplink subframe is beneficial as it allows selecting either a full subframe or a partial subframe, depending on the anticipated payload. To obtain low latency, it is also beneficial to be able to determine an uplink subframe located as soon as possible (subject to additional required processing delays) after the last subframe of the transmission burst, or a partial subframe wherein transmission without LBT may be allowed.

The aspects of the disclose embodiments also provide support for transmission bursts on different carriers. If the LBT procedures differ (e.g., different parameters, different types etc.) among carriers, the downlink transmission bursts may be of different lengths and may start at different times. Therefore, it is beneficial if the uplink subframe can be determined to accommodate a control channel being associated with transmission bursts on multiple carriers.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the presently disclosed disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A network node comprising:
    a transceiver; and
    a processor configured to:
        determine an identifier for a slot for an uplink control channel transmission, the uplink control channel transmission comprising at least HARQ-ACK information, wherein the slot for the uplink control transmission is based on at least an index of a slot in a downlink control channel that is configured to transmit the identifier, wherein the identifier corresponds to a set of slots for uplink control channel transmission according to the index of the slot in the downlink control channel in which the identifier is transmitted; and
        identify at least one slot from the set of slots for the uplink control channel transmission as a slot in which a listen-before-talk procedure is successful, wherein the listen-before-talk procedure is successful in response to a counter reaching a predetermined value, and wherein a count value of the counter is decreased in response to sensing that channel slots are free until the count value of the counter reaches the predetermined value;
    wherein the transceiver is configured to transmit the identifier in the downlink control channel.

2. The network node according to claim 1, wherein the processor is configured to set a value of the identifier at a same value in at least two slots of the downlink control channel.

3. The network node according to claim 1, wherein the processor is configured to set a value of the identifier at a first value in a first slot of the downlink control channel and at a second value different from the first value in at least one other slot of the downlink control channel.

4. The network node according to claim 1, wherein the processor is configured to set a value of the identifier such that the slot for the uplink control channel transmission corresponding to the identifier is a slot configured with a number of occupied OFDM symbols that is less than a maximum number of uplink OFDM symbols of a slot as defined by a wireless communication system.

5. The network node according to claim 1, wherein the processor is configured to set a value of the identifier such that transmission of the identifier comprises performing the listen-before-talk procedure with a pre-defined sensing interval.

6. The network node according to claim 1, wherein the network node includes one or more of a primary serving cell and at least one secondary serving cell, and wherein the processor is configured to signal an identifier in at least one slot of a downlink control channel associated with each of the primary serving cell and the at least one secondary serving cell.

7. The network node according to claim 1, wherein the processor is configured to include the identifier in a downlink control information (DCI) message included in a downlink control channel that schedules a physical downlink shared channel (PDSCH).

8. The network node according to claim 1,
    wherein the processor is configured to include the identifier in a common downlink control information (DCI) message, the common DCI comprising at least information of a number of OFDM symbols of a slot, and
    wherein the transceiver is configured to transmit the common DCI message in a slot having an index n−1 or n of the at least one slot of the downlink control channel.

9. A communication apparatus for a wireless communication system, comprising:
    a processor; and
    a transceiver configured to receive at least one identifier in at least one slot in a downlink control channel,
    wherein the processor is configured to:
        determine at least one slot for uplink control channel transmission from the at least one identifier and an index of a slot in the downlink control channel;
        wherein the at least one identifier corresponds to a set of slots for uplink control channel transmission according to the index of the slot in the downlink control channel; and
        identify the at least one slot for uplink control channel transmission from the set of slots for the uplink control channel transmission as a slot in which a listen-before-talk procedure is successful, wherein the listen-before-talk procedure is successful in response to a counter reaching a predetermined value, and wherein a count value of the counter is decreased in response to sensing that channel slots are free until the count value of the counter reaches the predetermined value; and
    wherein the transceiver is configured to transmit at least a HARQ-ACK feedback in the at least one slot determined for uplink control channel transmission.

10. The communication apparatus according to claim 9, wherein the transceiver is configured to receive data transmissions from one or more of a primary serving cell and at least one secondary serving cell, and wherein the processor is configured to identify the identifier from at least one slot in a downlink control channel of the primary serving cell and the at least one secondary serving cell.

11. The communication apparatus according to claim 10, wherein the processor is configured to identify a last slot of the at least one downlink control channel associated with the primary serving cell and at least one secondary serving cell, and use the identifier and the index from the identified last slot to determine the slot for the uplink control channel transmission.

12. The communication apparatus according to claim 9, wherein the transceiver is configured to receive at least two identifiers identifying a set of at least two slots for the uplink control channel transmission, and the processor is configured to transmit the HARQ-ACK feedback in a first slot from the set of at least two slots where an uplink control channel transmission is permitted.

13. A method comprising:
provinding an identifier, wherein the identifier is configured to be used by a network node to identify at least one slot for an uplink control channel transmission as a slot in which a listen-before-talk procedure is successful, the uplink control channel transmission comprising at least HARQ-ACK information, wherein the slot is based on an index of a slot in a downlink control channel that is configured to transmit the identifier and the identifier, wherein the listen-before-talk procedure is successful in response to a counter reaching a predetermined value, and wherein a count value of the counter is decreased in response to sensing that channel slots are free until the count value of the counter reaches the predetermined value; and
transmitting the identifier in at least one slot of the downlink control channel.

14. The method according to claim 13, comprising:
receiving the identifier in the at least one slot in the downlink control channel;
determining the at least one slot for the uplink control channel transmission from the identifier and the index; and
transmitting at least a HARQ-ACK feedback in the determined at least one slot.

* * * * *